US008661771B2

(12) United States Patent
Kodama

(10) Patent No.: US 8,661,771 B2
(45) Date of Patent: Mar. 4, 2014

(54) SEALING DEVICE AND MEDICINE PACKAGING APPARATUS

(75) Inventor: Tsuyoshi Kodama, Toyonaka (JP)

(73) Assignee: Yuyama MFG Co., Ltd., Osaka (JP)

( * ) Notice: Subject to any disclaimer, the term of this patent is extended or adjusted under 35 U.S.C. 154(b) by 471 days.

(21) Appl. No.: 13/055,351

(22) PCT Filed: Jul. 21, 2009

(86) PCT No.: PCT/JP2009/063027
§ 371 (c)(1),
(2), (4) Date: Jan. 21, 2011

(87) PCT Pub. No.: WO2010/010863
PCT Pub. Date: Jan. 28, 2010

(65) Prior Publication Data
US 2011/0126489 A1    Jun. 2, 2011

(30) Foreign Application Priority Data
Jul. 24, 2008    (JP) .................................. 2008-191501

(51) Int. Cl.
*B65B 51/10* (2006.01)

(52) U.S. Cl.
USPC ........................................ 53/373.7; 53/374.4

(58) Field of Classification Search
USPC ........ 53/373.7, 374.4, 374.3, 550, 562, 376.2
See application file for complete search history.

(56) References Cited

U.S. PATENT DOCUMENTS

| 2,208,951 | A | * | 7/1940 | Tamassy | 53/134.2 |
| 2,626,494 | A | * | 1/1953 | Lewis | 53/554 |
| 2,994,996 | A | * | 8/1961 | Klar | 53/134.2 |
| 3,074,214 | A | * | 1/1963 | Schneider et al. | 53/552 |
| 3,439,469 | A | * | 4/1969 | Van Mil, Jr. | 53/429 |
| 3,850,780 | A | * | 11/1974 | Crawford et al. | 156/583.4 |
| 4,164,833 | A | * | 8/1979 | Todd | 53/545 |
| 5,722,215 | A | | 3/1998 | Yuyama | |

(Continued)

FOREIGN PATENT DOCUMENTS

| GB | 2436119 B | 7/2010 |
| JP | 7-317726 | 12/1995 |

(Continued)

OTHER PUBLICATIONS

International Search Report for PCT/JP2009/063027, 2 pages, mailed Dec. 28, 2009.

*Primary Examiner* — Sameh H. Tawfik
(74) *Attorney, Agent, or Firm* — Jones Day

(57) ABSTRACT

A sealing device and a medicine packaging apparatus that includes the sealing device, wherein an engaging mechanism for coupling frames has good operability and the frames can firmly engage each other. The sealing device (10) can couple roller frames (20a, 20b) by an engaging mechanism (40) to integrate the roller frames. The engaging mechanism (40) has an engager (45) and a receptor (46) formed of a recess or the like. The engager includes a manipulation lever (50) and an engaging lever (51). The engager (45) is provided in the roller frame (20a), while the receptor (46) is provided in the roller frame (20b). When the manipulation lever (50) is pushed and pivoted toward the roller frame (20b), the engaging mechanism (40) can integrate the roller frames (20a, 20b). When the manipulation lever (50) is pulled and pivoted toward a front portion, the engaging mechanism can release the engagement caused by the engaging mechanism (40) to allow the roller frames (20a, 20b) to be separable from each other.

6 Claims, 14 Drawing Sheets

(56) References Cited

U.S. PATENT DOCUMENTS 5,761,878 A * 6/1998 Walkiewicz et al. ......... 53/373.5
5,875,610 A * 3/1999 Yuyama et al. .................. 53/75
6,305,526 B1 * 10/2001 Kodama et al. ............ 198/463.4

FOREIGN PATENT DOCUMENTS

| JP | 9-70729 | 3/1997 |
| JP | 3057030 | 12/1998 |
| JP | 2942769 | 6/1999 |

* cited by examiner

FIG. 4
(a)
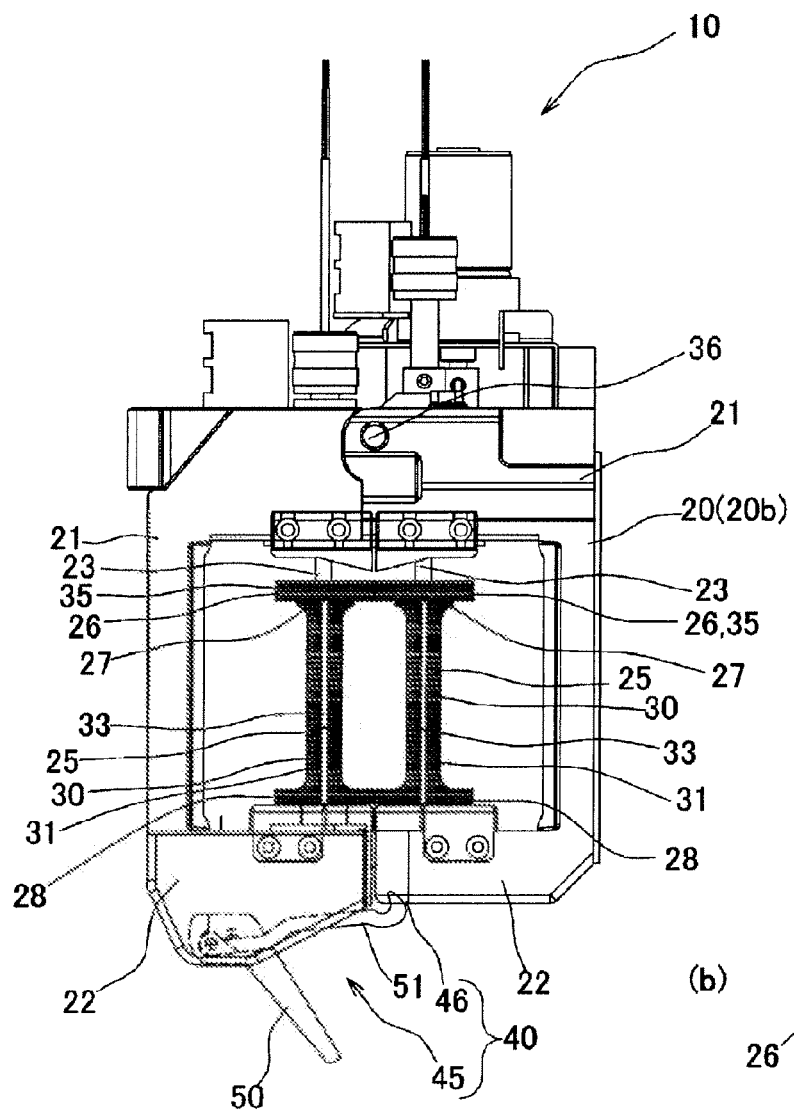
(b)
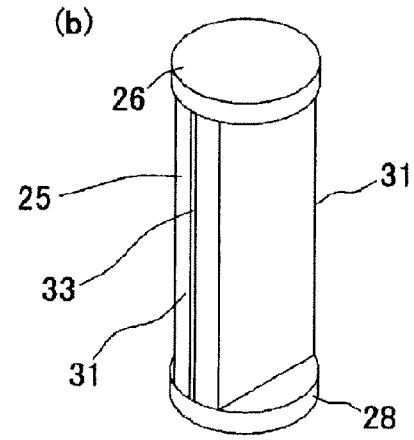

FIG. 13
(a)
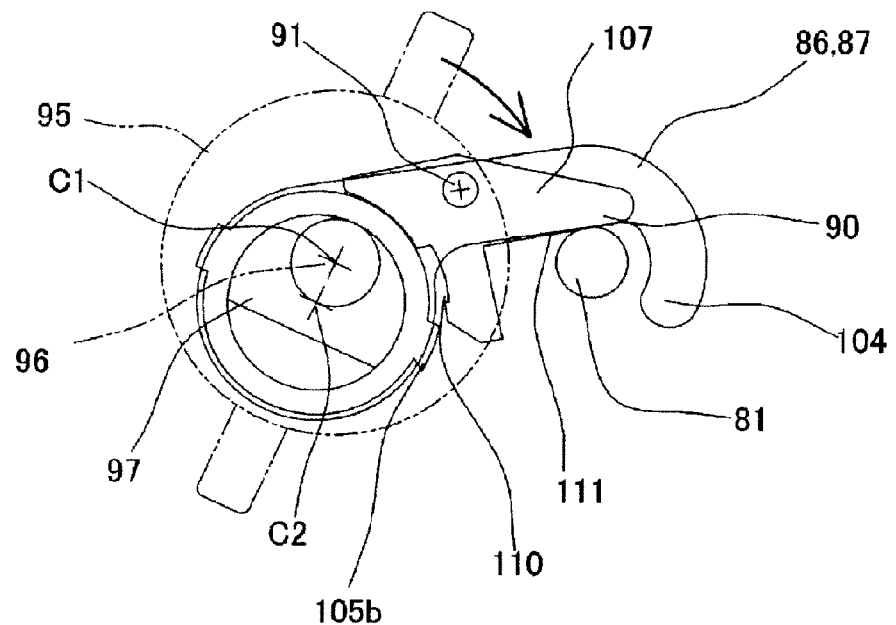
(b)
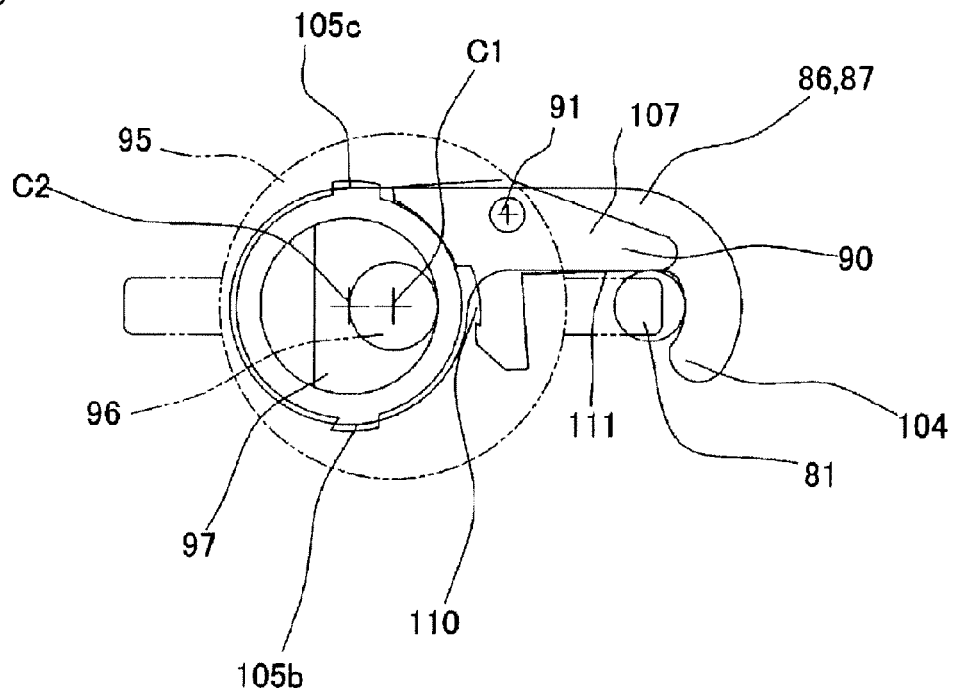

SEALING DEVICE AND MEDICINE PACKAGING APPARATUS

CROSS-REFERENCE TO RELATED APPLICATIONS

This application is a 35 U.S.C §371 national stage filling of International Application No. PCT/JP2009/063027, filed Jul. 21, 2009, the entire contents of which are incorporated by reference herein, which claims priority to Japanese Patent Application No. 2008-191501, filed Jul. 24, 2008, the entire contents of which are incorporated by reference herein.

TECHNICAL FIELD

The present invention relates to a sealing device for sealing packaging paper. Further, the present invention relates to a medicine packaging apparatus including such a sealing device.

BACKGROUND

Sealing devices are disclosed in Patent Documents 1 and 2 mentioned below, which are used for packaging medicine in a medicine packaging apparatus. Sealing devices are also known to have a pair of frames in which heating parts are provided so as to be rotatable around a rotating shaft. Sealing devices are also known to be capable of fusion-bonding a medicine packaging sheet and forming the same into a medicine pack shape by nipping and heating the medicine packaging sheet between heating parts while the medicine packaging sheet are being passed through a clearance formed between the heating parts.
Patent Document 1: Japanese Patent No. 2942769
Patent Document 2: Japanese Patent No. 3057030

In the abovementioned sealing devices, the pair of frames are joined to each other at each of their one ends via a hinge. Thus, when necessary, the pair of frames can be separated from each other so that the medicine packaging sheet can be set or maintenance work can be conducted. Further, in the prior art sealing devices, an engaging mechanism including a hook-shaped claw or other connectors is provided on the other ends of the pair of frames. Such an engaging mechanism does not allow the frames to be separable from each other, thereby keeping the clearance formed between the heating parts suitable for fusion-bonding the medicine packaging sheet.

SUMMARY OF THE INVENTION

There is a problem with the sealing devices described above in that the labor needed for detaching a claw or connector constituting the engaging mechanism is comparatively complicated. Further, the medicine packaging apparatus contains a large number of devices and thus its internal configuration is relatively complex. Thus, improvement in the operability of the engaging mechanism is desired. Furthermore, if the frames in the sealing device are not firmly integrated by means of the engaging mechanism, then a width of the clearance formed between the heating parts becomes inconsistent, thereby failing to fusion-bond the medicine packaging sheet reliably.

Thus, in light of the aforementioned demand in the art and the foregoing problems, it is an object of some embodiments to provide a sealing device wherein an engaging mechanism for coupling frames has good operability and the frames can firmly engage each other. It is a further object of other embodiments to provide a medicine packaging apparatus including such a sealing device.

The invention, which is provided in order to achieve the above-mentioned objects, is a sealing device including: a pair of frames A, B each including a heating part attached thereto such that each of the heating parts are rotatable around a predetermined rotating shaft, the heating part generating heat by energization; and an engaging mechanism configured to couple the frames A, B such that the frames A, B are not separated in a direction that widens a gap between the heating parts. When the frames A, B are coupled by the engaging mechanism, a thermally bondable sheet is fusion-bonded while being passed through a clearance formed between the heating parts. The engaging mechanism includes an engager and a receptor. The engager is provided in the frame A and includes: a first rotator rotatable around a first shaft; and a second rotator rotatable around the first shaft in concomitance with a rotation of the first rotator, the second rotator eccentrically rotatable relative to the first shaft. The receptor is provided in the frame B and the second rotator is engageable to the receptor. The engaging mechanism is switchable to a first engagement state where the second rotator is engageable to the receptor in a position P1 by the rotation of the first rotator of the engager and to a second engagement state where the second rotator is pulled to a position P2 closer to the frame A than the position P1 engaging the receptor.

In the engaging mechanism employed in the sealing device according to one embodiment, the engager provided in the frame A has the first rotator rotatable around the first shaft and the second rotator eccentrically rotatable relative to the first shaft. If the first rotator is rotated and thus the engaging mechanism goes into the first engagement state, then the second rotator approaches position P1 where the second rotator can engage the receptor provided in the frame B. If the engaging mechanism goes into the second engagement state, then the second rotator can approach position P2 closer to the frame A than position P1. Thus, if the first engagement state is achieved by manipulating the first rotator and thereafter the second engagement state is achieved by rotating the first rotator, then the frames A, B in some embodiments can be firmly integrated through the engaging mechanism with the frame B pulled toward the frame A by the second rotator engaging the engager. Further, the sealing device can firmly integrate the frames A, B merely by manipulating the first rotator, thereby providing high operability.

Further, according to the above-described construction, the frames can be integrated with the frame B pulled toward the frame A. Thus, when the frames A, B become separable by releasing the engaging mechanism and thereafter the frames A, B are integrated again by means of the engaging mechanism, the sealing device can keep the width of the clearance formed between the heating parts provided in the respective frames A, B nearly constant. Accordingly, even if the frames A, B are uncoupled and thereafter coupled again, the sealing device can revert to a state of fusion-bonding the sheet without conducting a particular operation such as a readjustment of the clearance between the heating parts.

According to the sealing device, a manipulation lever constituting the first rotator and an engaging lever constituting the second rotator may be rotatably supported around the first shaft in the frame A. The engaging lever may be rotatably supported around a second shaft located eccentrically relative to the first shaft.

The above construction may allow the sealing device to be capable of easily and firmly integrating the frames A, B through the manipulation of the manipulation lever.

According to the sealing device, the second rotator may include: an eccentric rotator eccentrically rotatable relative to the first shaft; an engaging piece engageable to the receptor; and a connector configured to connect the eccentric rotator and the engaging piece such that the eccentric rotator and the engaging piece are integratedly rotatable. The second rotator may be switchable to an integrated rotation state where the eccentric rotator and the engaging piece are connected and integrated via the connector to be eccentrically rotatable and to an independent rotation state where the eccentric rotator and the engaging piece are disconnected and the eccentric body is eccentrically rotatable independently relative to the engaging piece. When the engaging piece engages the receptor, the engaging mechanism may go into the first engagement state and the second rotator may go into the independent rotation state. When the eccentric body is eccentrically rotated independently relative to the engaging piece in the independent rotation state, the engaging piece may be moved toward the frame A by the eccentric body and the engaging mechanism may go into the second engagement state.

According to the sealing device of the present invention, by manipulating and rotating the first rotator when the second rotator is in the integrated rotation state, the eccentric rotator and the engaging piece can be integrated and thus eccentrically rotated through the connector. Further, if the engaging piece of the second rotator engages the receptor through the manipulation of the first rotator and the first engagement state is achieved thereby, then the second rotator goes into the independent rotation state and the eccentric body becomes eccentrically rotatable independently relative to the engaging piece. If the first rotator is further manipulated and rotated from such a state, then the eccentric body is eccentrically rotated independently relative to the engaging piece and the second engagement state is achieved. Thus, the sealing device of the present invention can easily and firmly integrate the frames A, B through the manipulation of the first rotator.

Further, with regard to achieving the second engagement state, the engaging piece is moved toward the frame A (i.e., in a direction away from the receptor) by means of the eccentric body by manipulating and rotating the first rotator in the independent rotation state and thus eccentrically rotating the eccentric body independently relative to the engaging piece, thereby achieving the second engagement state. Thus, the sealing device integrates the frames A, B with the frame B firmly pulled to the frame A. Also, the sealing device can keep the clearance formed between the pair of heating parts nearly constant whenever the frames A, B are integrated. Accordingly, when the frames A, B are once separated and thereafter return to their integration state, the sealing device can revert to a state of fusion-bonding the sheet without separately conducting a complicated operation such as the readjustment of the clearance between the heating parts.

According to the sealing device, the second rotator may include a rotary power transmitter integratedly rotatable with the eccentric rotator, the rotary power transmitter being configured to transmit a rotary power exerted to the eccentric rotator to the engaging piece via the connector by engaging the connector. The connector may be tiltably supported relative to the engaging piece by a tilting shaft attached to the engaging piece. When the engaging piece is brought into abutment with the receptor, the connector may tilt around the tilting shaft and the drive transmitter may disengage from the connector, thereby going into the independent rotation state. When the engaging piece is separated from the receptor, the drive transmitter engages the connector, thereby going into the integrated rotation state.

A medicine packaging apparatus of the present invention may include the above-described sealing device of the present invention.

According to such construction, there is provided a medicine packaging apparatus wherein the frames A, B can be firmly integrated with high operability in association with setting the sheet in the sealing device and separating/integrating the frames A, B for maintenance purpose.

According to the medicine packaging apparatus recited, the medicine packaging apparatus may include a housing that houses the sealing device and is openable and closable for manipulation of the sealing device. It is preferred that the frame A is arranged in a front portion with respect to the frame B in the opened housing.

In the medicine packaging apparatus of the present invention, the frame A is located at the front in the opened housing, thereby providing easy manipulation of the first rotator.

The present invention can provide the sealing device wherein the engaging mechanism for coupling the frames has good operability and the frames can firmly engage each other. Further, the present invention can provide the medicine packaging apparatus including the sealing device.

BRIEF DESCRIPTION OF THE DRAWINGS

FIG. 4(a) is a front view showing the sealing device with a protective cover removed therefrom.

FIG. 4(b) is a perspective view showing a perpendicular heating part.

FIGS. 9(a) to 9(c) are enlarged front views showing the configuration of the sealing device with its portion having the engaging mechanism shown fragmentarily, wherein FIG. 9(a) shows the manipulation lever in the closed state; FIG. 9(b) shows that the engaging lever does not come off from the receptor when the manipulation lever is in the open state; and FIG. 9(c) shows that the engaging lever comes off from the receptor when the manipulation lever in the open state. Further, FIG. 9(b) is a diagram showing a trajectory of a second shaft.

FIGS. 13(a) and 13(b) illustrate the operation of the engaging mechanism shown in FIG. 10 in sequential steps respectively.

DESCRIPTION OF REFERENCE NUMERALS

1 ... Medicine Packaging Apparatus
2 ... Housing
6 ... Medicine Packaging Unit
10 ... Sealing Device
12 ... Packaging Paper (Sheet)
20 ... Roller Frame (Frame)
25 ... Perpendicular Heating Part (Heating Part)
26 ... Horizontal Heating Part (Heating Part)
40, 70 ... Engaging Mechanism
45 ... Engager
80 ... Engager
46, 81 ... Receptor
50 ... Manipulation Lever (First Rotator)
51 ... Engaging Lever (Second Rotator)
52 ... First Shaft
61 ... Second Shaft
86, 87 ... Engaging Piece
90 ... Tilting Piece (Connector)
91 ... Tilting Shaft
96 ... Rotating Shaft (First Rotator)
97 ... Eccentric Cam (Second Rotator, Eccentric Rotator)
C1 ... Axial Center (First Shaft)
C2 ... Center (Second Shaft)

DETAILED DESCRIPTION

Figure 1:
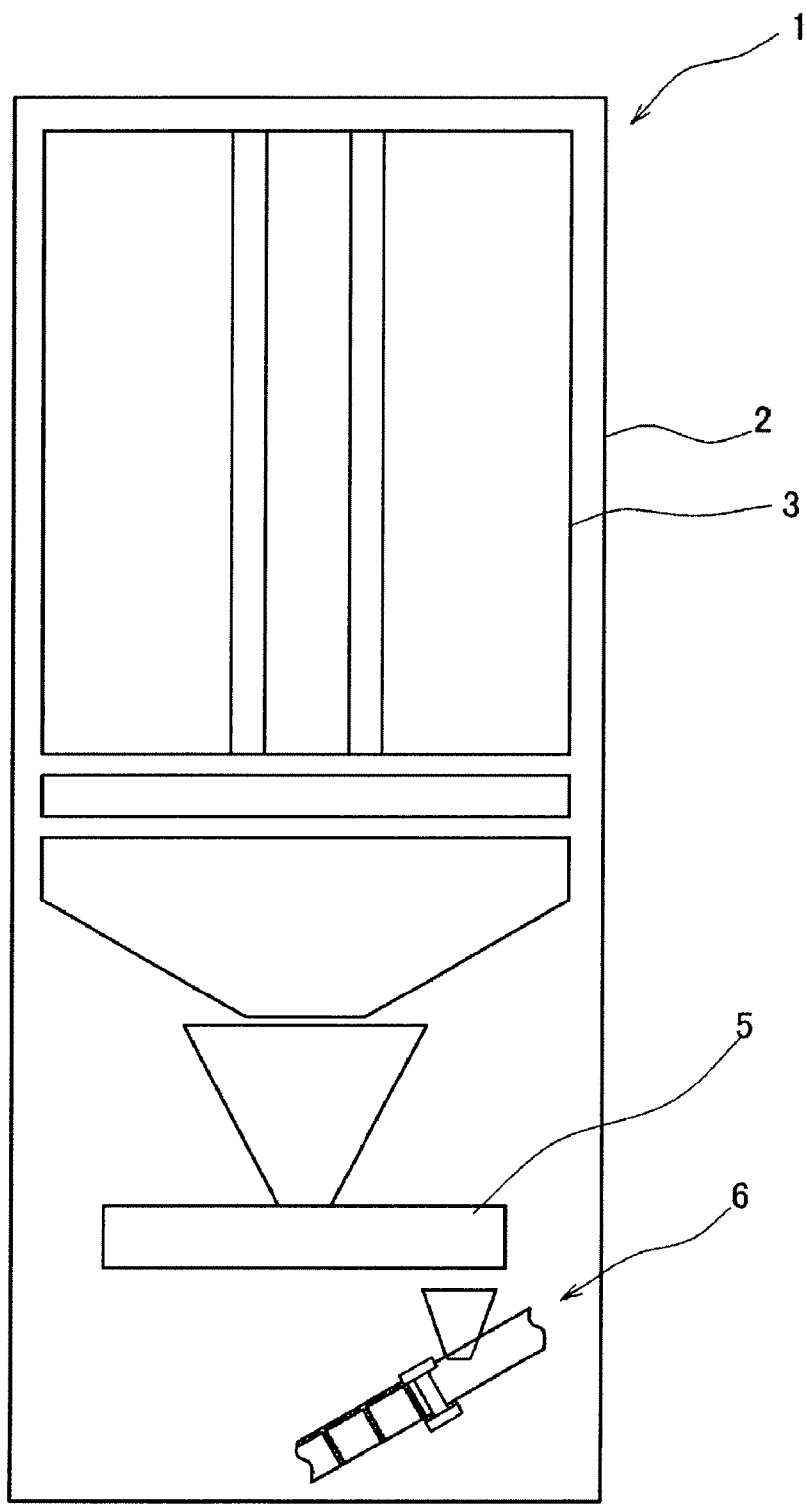
FIG. 1 schematically shows an internal configuration of a medicine packaging apparatus according to one embodiment of the present invention.

A medicine packaging apparatus 1 and a sealing device 10 according to embodiments of the present invention will be described below in detail with reference to the accompanying drawing. As shown in FIG. 1, the medicine packaging apparatus 1 has, inside a housing 2, the following: a medicine supplying unit 3, a medicine preparing unit 5 and a medicine packaging unit 6. The medicine supplying unit 3 functions to store medicines and to dispense the medicines to the medicine preparing unit 5 according to prescriptions. Further, the medicine preparing unit 5 functions to collect medicines pack by pack and to dispense the same to the medicine packaging unit 6. The medicine packaging unit 6 is a key component in the medicine packaging apparatus 1 according to this embodiment. The medicine packaging unit functions to package the medicines, which are dispensed from the medicine preparing unit 5, on a pack by pack basis.

Figure 2:
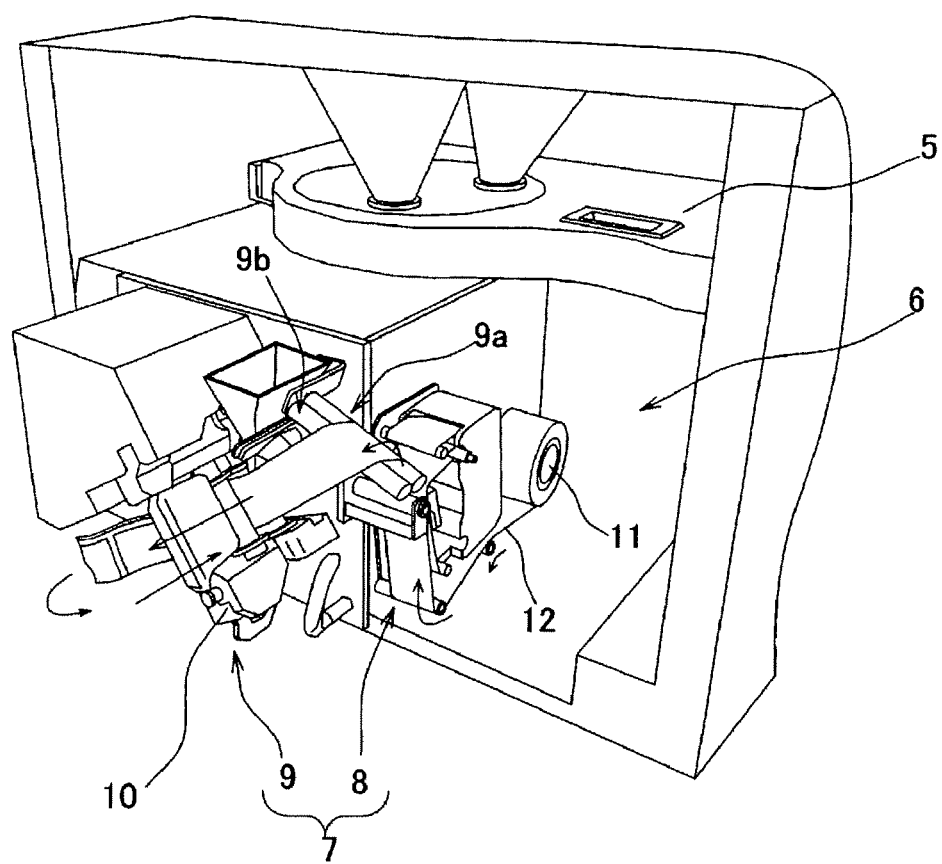
FIG. 2 is a perspective view showing the configuration of the medicine packaging apparatus shown in FIG. 1 around a medicine preparing unit and a medicine packaging unit.

As shown in FIG. 2, the medicine packaging unit 6 is provided below the medicine preparing unit 5. The medicine packaging unit 6 has a packaging means 7. The packaging means 7 has a sheet conveying mechanism 8 and a packaging mechanism 9. The sheet conveying mechanism 8 unwinds and sends a packaging paper 12 wound around a roll shaft 11. The packaging paper has the shape of an elongated sheet. The packaging paper includes a thermally bondable sheet. The packaging mechanism 9 has a sheet supporter 9a, a guide member 9b and the sealing device 10. The packaging mechanism folds the packaging paper 12 sent from the sheet conveying mechanism 8 in half along an approximate center in its short side (in its width direction) and then presses the folded packaging paper 12 to form the same into a medicine pack shape.

The guide member 9b functions to guide the packaging paper 12 sent from the sheet conveying mechanism 8 and to fold the elongated packaging paper 12 in half along an approximate center in its width direction. The sealing device 10 can press a longitudinal end portion (a downstream portion) of the packaging paper 12, which is folded in half in advance by the guide member 9b and thus becomes a bifold, to form the same into a half medicine pack shape. Further, the sealing device can press an open portion of the packaging paper 12 formed into the half medicine pack shape to seal the open portion and thereby form the packaging paper into the medicine pack shape.

Figure 3:
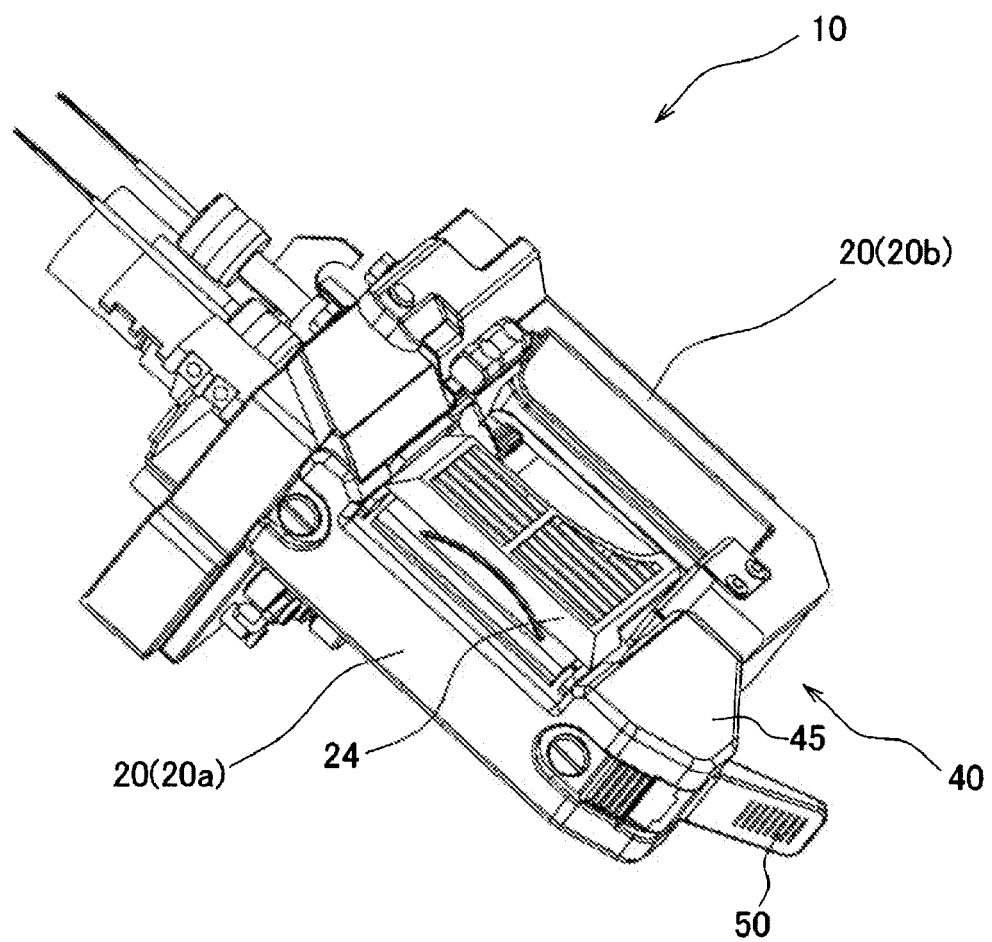
FIG. 3 is a perspective view showing a sealing device.

As shown in FIGS. 3 and 4, the sealing device 10 has a main component including a pair of roller frames 20, 20 (hereinafter, where necessary, these are referred to as a roller frame 20a and a roller frame 20b respectively). As shown in FIG. 3, the sealing device 10 includes a protective cover 24 at the roller frame 20a. As shown in FIG. 4 wherein the protective cover 24 is removed, the roller frames 20a, 20b are in approximately bilateral symmetry abutting against each other.

As shown in FIG. 4, the roller frame 20 includes a metallic frame having a horizontal U shape when viewed from front. The roller frame 20 has an upper edge portion 21 and a lower edge portion 22 substantially parallel to the upper edge portion. The roller frame 20 has a supporting shaft 23 substantially perpendicular to the upper edge portion 21 and the lower edge portion 22. A perpendicular heating part 25 and a horizontal heating part 26 are attached to the supporting shaft. The perpendicular heating part 25 and the horizontal heating part 26 are rotatable around the supporting shaft 23. Further, the perpendicular heating part 25 and the horizontal heating part 26 are connected to respective power sources (not shown) via respective power transmitting mechanisms (not shown) to thus be rotatable independently relative to each other.

The perpendicular heating part 25 is made from a metallic material. As shown in FIG. 4(a), the perpendicular heating part has a substantial I shape when viewed from front. As shown in FIG. 4(b), the perpendicular heating part 25 has a disk-shaped upper end 27, a disk-shaped lower end 28 and a plate-shaped heating portion 30. The heating portion 30 is located between and is substantially perpendicular to the upper end 27 and the lower end 28. Heaters 31 and a perforation forming means 33 are linearly disposed on both sides of the heating portion 30 from the upper end 27 to the lower end 28. The heaters 31, 31 are capable of thermal-bonding the packaging paper 12. Further, the perforation forming means 33 is capable of forming serial perforations. In this embodiment, the perforation forming means 33 of the roller frame 20b includes a cutter for forming serial perforations, while the perforation forming means 33 of the roller frame 20a includes a tooth rest that is provided to correspond to said cutter.

As shown in FIG. 4(a), the horizontal heating part 26 is disposed between the upper end 27 of the perpendicular heating part 25 and the upper edge portion 21 of the roller frame 20. The horizontal heating part 26 is a disk-shaped member having a shape and being substantially the same size as the upper end 27 or the lower end 28 of the perpendicular heating part 25. A heater 35 is provided in a periphery of the horizontal heating part 26 throughout its entire periphery.

As shown in FIG. 4, the roller frames 20a, 20b are connected to each other via a hinge 36 attached to the upper edge portions 21, 21 and thus are separable from each other. The roller frames 20a, 20b are connected such that the upper edge portions 21, 21 and the lower edge portions 22, 22 can abut against each other respectively. Thus, in the sealing device 10, if the roller frames 20a, 20a come in contact with each other and the upper edge portions 21, 21 and the lower edge portions 22, 22 are mated with each other respectively, then perpendicular heating parts 25, 25 and the horizontal heating parts 26, 26 are juxtaposed side by side within an approximately rectangular region enclosed by the roller frames 20a, 20b.

Figure 9:
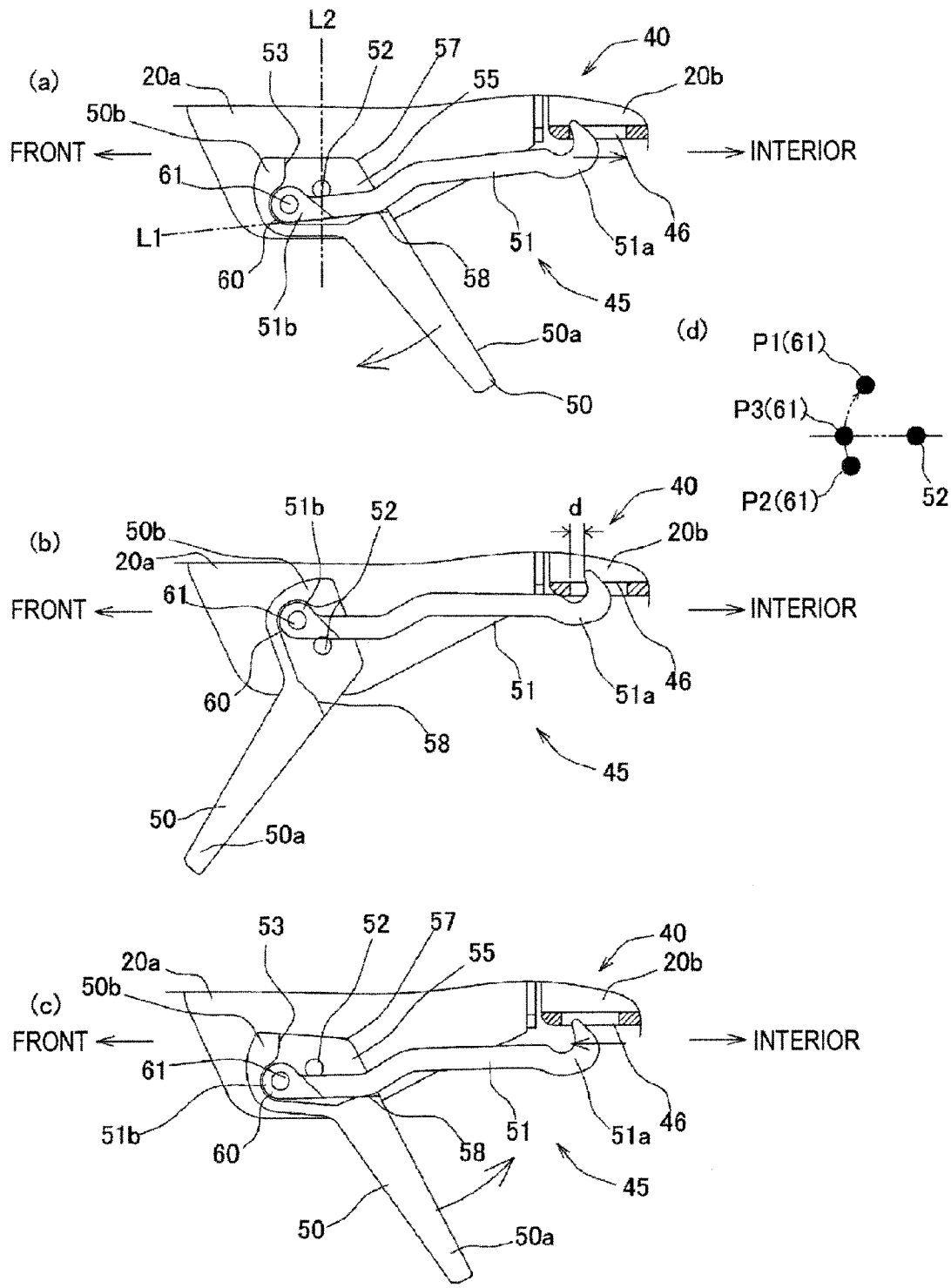

An engaging mechanism 40 is provided in the lower edge portions 22 of the roller frames 20a, 20b. The engaging mechanism 40 includes an engager 45 provided in the roller frame 20a and a receptor 46 provided in the roller frame 20b. As shown in FIG. 9, the engager 45 includes a manipulation lever 50 (first rotator) and an engaging lever 51 (second rotator). The manipulation lever 50 is attached to the lower edge portion 22 of the roller frame 20a to be pivotable around a first shaft 52 provided at its base end.

The manipulation lever 50 can be positionally switched or shifted to the following positions: one position where it is tilted toward the roller frame 20b (toward an interior in an operator's view) as shown in FIG. 9(a) (hereinafter, this position is referred to as a closed position); and the other position where it is tilted toward the roller frame 20a (toward the front of the operator) as shown in FIG. 9(b) (hereinafter, this position is referred to as an open position). The manipulation lever 50 is biased by a spring (not shown) so as to be in a closed state shown in FIG. 9(a) within a predetermined angular range. Thus, the manipulation lever 50 can be placed in the open position when the operator pulls in the manipulation lever beyond the predetermined angular range toward the front.

The manipulation lever 50 has a grip portion 50a and a base end portion 50b. The manipulation lever 50 has a recess 55 compartmentalized in the base end portion 50b by a compartmentalizing surface 53. The recess 55 opens outward at a portion in which the compartmentalizing surface 53 does not continue (hereinafter, this portion is referred to as an open portion 57). The compartmentalizing surface 53 has a supporting portion 58 at an interface to the open portion 57. When the manipulation lever 50 is placed in the position shown in FIG. 9(a) (hereinafter, referred to as the closed position), the supporting portion 58 becomes nearly horizontal. The manipulation lever 50 is attached in the closed position such that it protrudes from the open portion 57 toward the roller frame 20b with the grip portion 50a tilted toward the roller frame 20b.

The aforesaid first shaft 52 is provided in an approximate center of the recess 55. The first shaft 52 is located apart from an extension line of the supporting portion 58 constituting the compartmentalizing surface 53. Further, a receiving portion 60, in which a base end portion of the engaging lever 51 (this will be described below) is received, is provided in the recess 55. A second shaft 61 is provided in the receiving portion 60 in a position apart from the first shaft 52. More specifically, when assuming the aforesaid extension line L1 of the supporting portion 58, the second shaft 61 is located further apart from the extension line L1 than the first shaft 52. Further, when assuming a perpendicular line L2 passing through the position where the first shaft 52 is provided, the receiving portion 60 and the second shaft 61 are located further apart from the roller frame 20b than the perpendicular line L2. The second shaft 61 is fixed relative to the manipulation lever 50, whereas it is not fixed directly relative to the roller frame 20a. Accordingly, if the manipulation lever 50 is rotated around the first shaft 52, then the second shaft 61 is moved while forming a circular-arc about the first shaft 52. Further, comparing one position of the second shaft 61 when the manipulation lever 50 is in the closing position shown in FIG. 9(a) with another position of the second shaft 61 when the grip portion 50a is away from the roller frame 20b (hereinafter, referred to as the open position) as shown in FIG. 9(b), the second shaft 61 is located further apart from the roller frame 20b in the closed position than in the open position.

As shown in FIG. 9, the engaging lever 51 is a long and thin member and its main part is made from a metallic material. A distal end portion 51a of the engaging lever 51 is formed in the shape of a hook. The engaging lever 51 is attached such that it projects outward from the open portion 57 of the recess 55 (toward the roller frame 20b) and its base end portion 51b is received in the aforesaid receiving portion 60 provided in the recess 55 of the manipulation lever 50. The base end portion 51b of the engaging lever 51 is pivotally supported by the second shaft 61 provided in the recess 55 of the manipulation lever 50.

Further, the engaging lever 51 is biased upward by a spring (not shown). Thus, when the manipulation lever 50 is switched from the closed position shown in FIG. 9(a) to the open position shown in FIG. 9(b), the engaging lever 51 tends to maintain its state with the distal end portion 51a lifted upward. However, if the operator tilts the manipulation lever 50 toward the front, then the compartmentalizing surface 53 forming the recess 55 of the manipulation lever 50 pushes against the base end portion 51b of the engaging lever 51, thereby exerting an external force to the engaging lever 51 in a direction against such a pushing force. When the external force acting on the engaging lever 51 due to the manipulation of the manipulation lever 50 goes beyond the biasing force acting on the engaging lever 51, the engaging lever 51 is allowed to pivot around the second shaft 61. Further, at this time, along with the rotation of the manipulation lever 50, the second shaft 61 is moved while forming a circular arc around the first shaft 52. Thus, as the manipulation lever 50 is switched from the closed position to the open position, the engaging lever 51 is oscillated (eccentrically rotated) relative to the first shaft 52 to thereby be placed with the distal end portion 51a tilted downward around the second shaft 61.

The receptor 46 is provided in the lower edge portion 22 of the roller frame 20b. The receptor 46 may be configured as a recess opening downward or a cutaway portion. The receptor is provided in a position where the distal end portion 51a of the engaging lever 51 catches and thus engages the receptor when the manipulation lever 50 of the engager 45 provided in the roller frame 20a is situated in the closed position.

Figure 5:
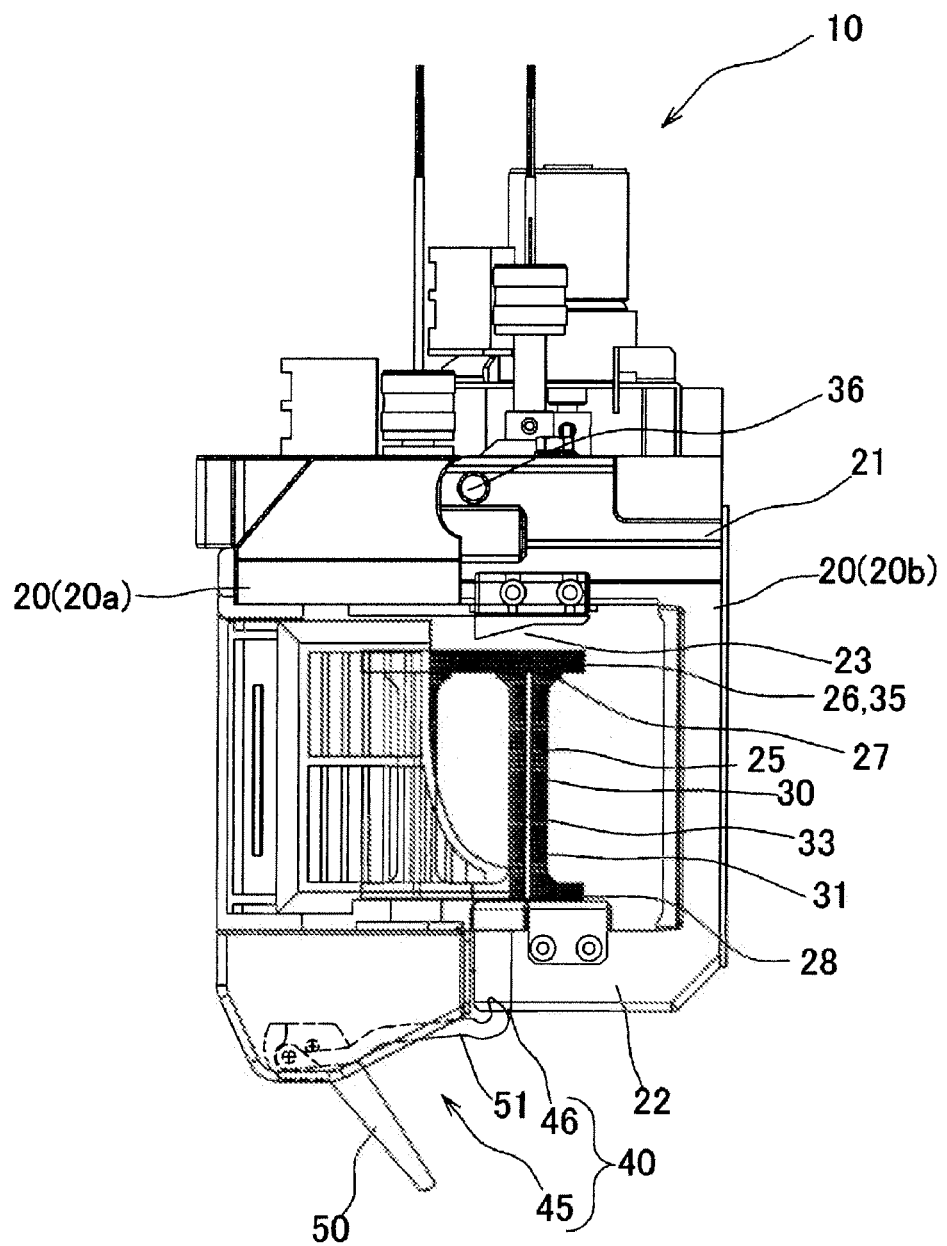
FIG. 5 is a partially cutaway front view showing a configuration of the sealing device when a manipulation lever is in a closed state.

The sealing device 10 is arranged such that, when opening the housing 2 of the medicine packaging apparatus 1 for maintenance purposes, the roller frame 20a is located at the front with respect to the roller frame 20b and thus the manipulation lever 50 of the engaging mechanism 40 provided in the lower edge portion 22 can be manipulated. In normal use of the sealing device 10, as shown in FIGS. 4(a) and 5, the manipulation lever 50 is in the closed position with the grip portion 50a tilted toward the roller frame 20b and the engaging lever 51 provided in the roller frame 20a is fitted to and engages the receptor 46 provided in the roller frame 20b.

Figure 6:
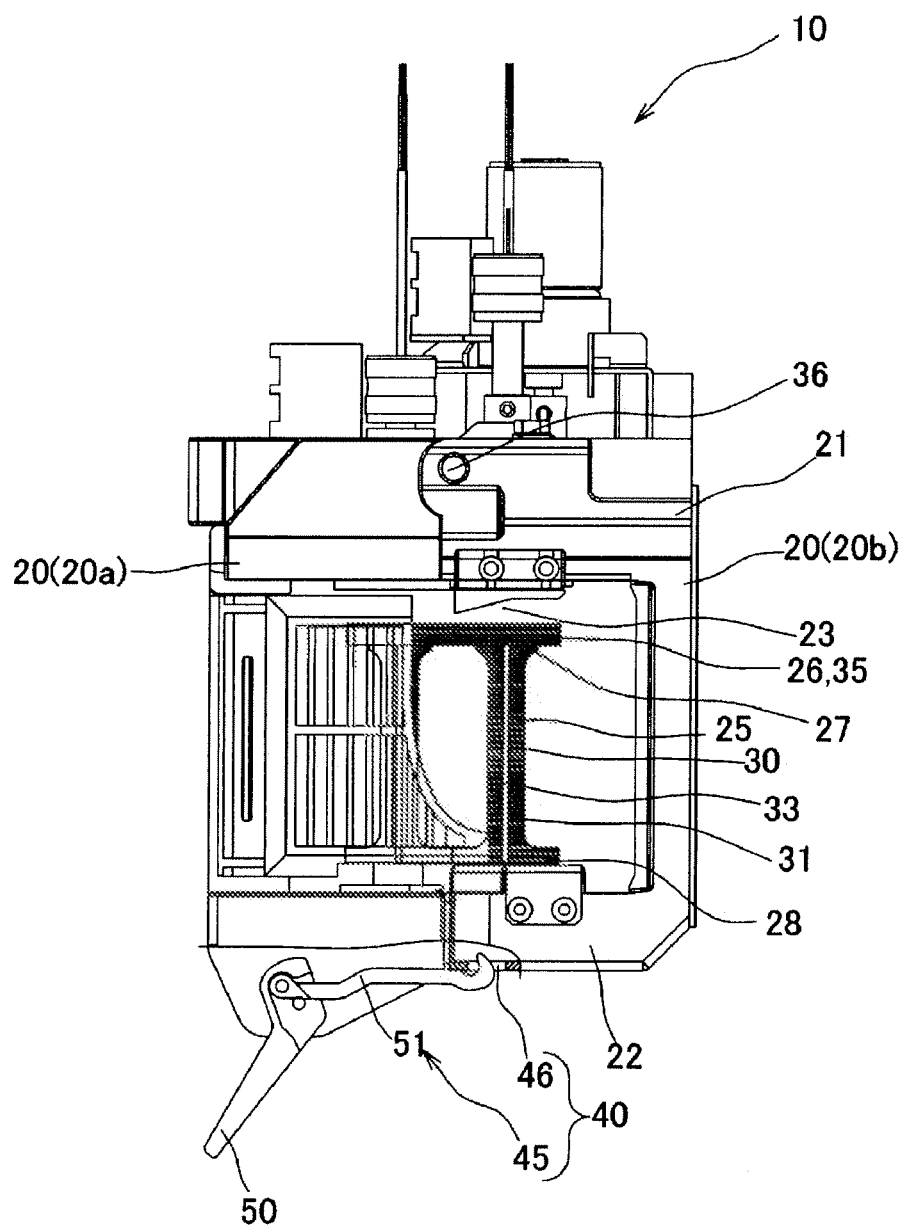
FIG. 6 is a front view showing that an engaging lever does not come off from a receptor when the manipulation lever is in in an open state.

Further, when replacing the packaging paper 12 or performing maintenance work, as shown in FIGS. 6(a) and 9, the sealing device 10 can be situated such that the roller frames 20a, 20b become separable from each other by setting the manipulation lever 50 to the open position to release the engagement between the engaging lever 51 and the receptor 46. Specifically, if the operator pulls in the grip portion 50a located in the housing 2 toward the front (i.e., in a direction away from the roller frame 20b), then the manipulation lever 50 is pivoted around the first shaft 52, as shown in FIGS. 6 and 9(b). While the manipulation lever 50 is being pivoted to the open position, the second shaft 61 fitted to the base end portion 51b of the engaging lever 51 pivots around the first shaft 52.

More specifically, the second shaft 61 moves upward from a position shown in FIG. 9(a) lower than the first shaft 52

(hereinafter, this position is referred to as a P2 position) while forming a circular arc about the first shaft 52. That is, in view of the orientation shown in FIG. 9(*a*), the second shaft 61 pivots counterclockwise around the first shaft 51. When the manipulation lever 50 is tilted to the front of the operator to go into the open position as shown in FIG. 9(*b*), the second shaft 61, which is located lower than the first shaft 52 in the closed position, is moved to a position higher than the first shaft 52 (hereinafter, this position referred to as a P2 position). As a result, the base end portion 51*b* of the engaging lever 51 is lifted upward and the engaging lever 51 becomes nearly horizontal as a whole.

Further, considering a horizontal movement of the second shaft 61 when manipulating the manipulation lever 50 as described above, the second shaft 61 is first moved in a direction further apart from the roller frame 20*b* than the P2 position in mid course of the shifting of the second shaft 61 from the position shown in FIG. 9(*a*) to the position shown in FIG. 9(*b*). Specifically, the second shaft 61 is moved in concomitance with the manipulation of the manipulation lever 50 while forming a trajectory shown in FIG. 9(*d*). Accordingly, while manipulating the manipulation lever 50, the second shaft 61 is moved in a direction away from the roller frame 20*b* during the movement of the second shaft 61 from the aforesaid P1 position till a position where the second shaft is placed horizontally relative to the first shaft 52 (hereinafter, this position is referred to as a P3 position). However, as the manipulation lever 50 is rotated such that the second shaft 61 goes beyond the P3 position (this corresponds to an intersection between a horizontal line passing through the height of the first shaft 52 and the circular arc of the trajectory of the second shaft 61) and moves further upward, the second shaft 61 is moved toward the roller frame 20*b* (i.e., toward the interior of the housing 2 of the medicine packaging apparatus 1) and then finally comes to the P2 position closer to the roller frame 20*b* than the P2 position.

Figure 7:
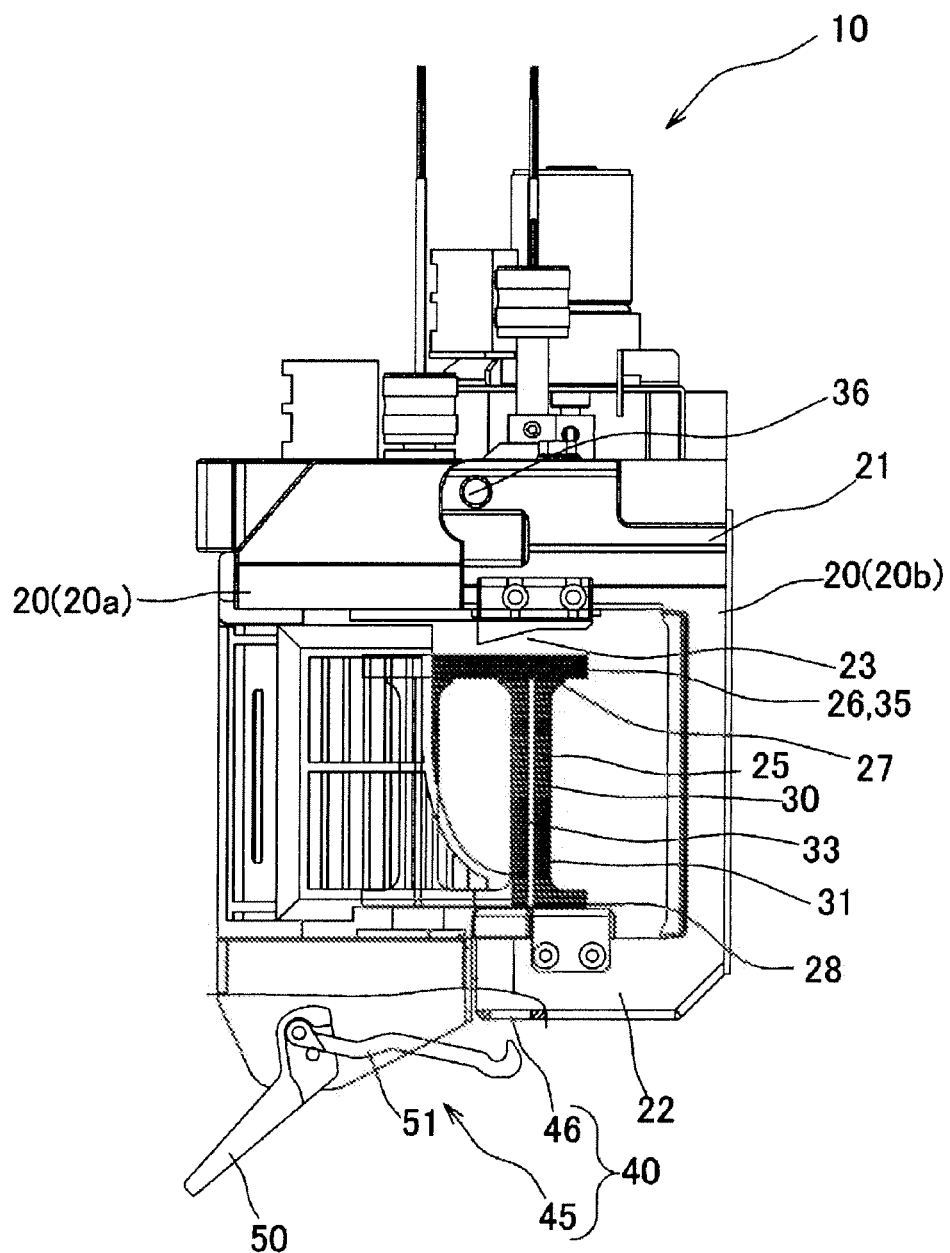
FIG. 7 is a front view showing that the engaging lever comes off from the receptor when the manipulation lever is in the open state.
Figure 8:
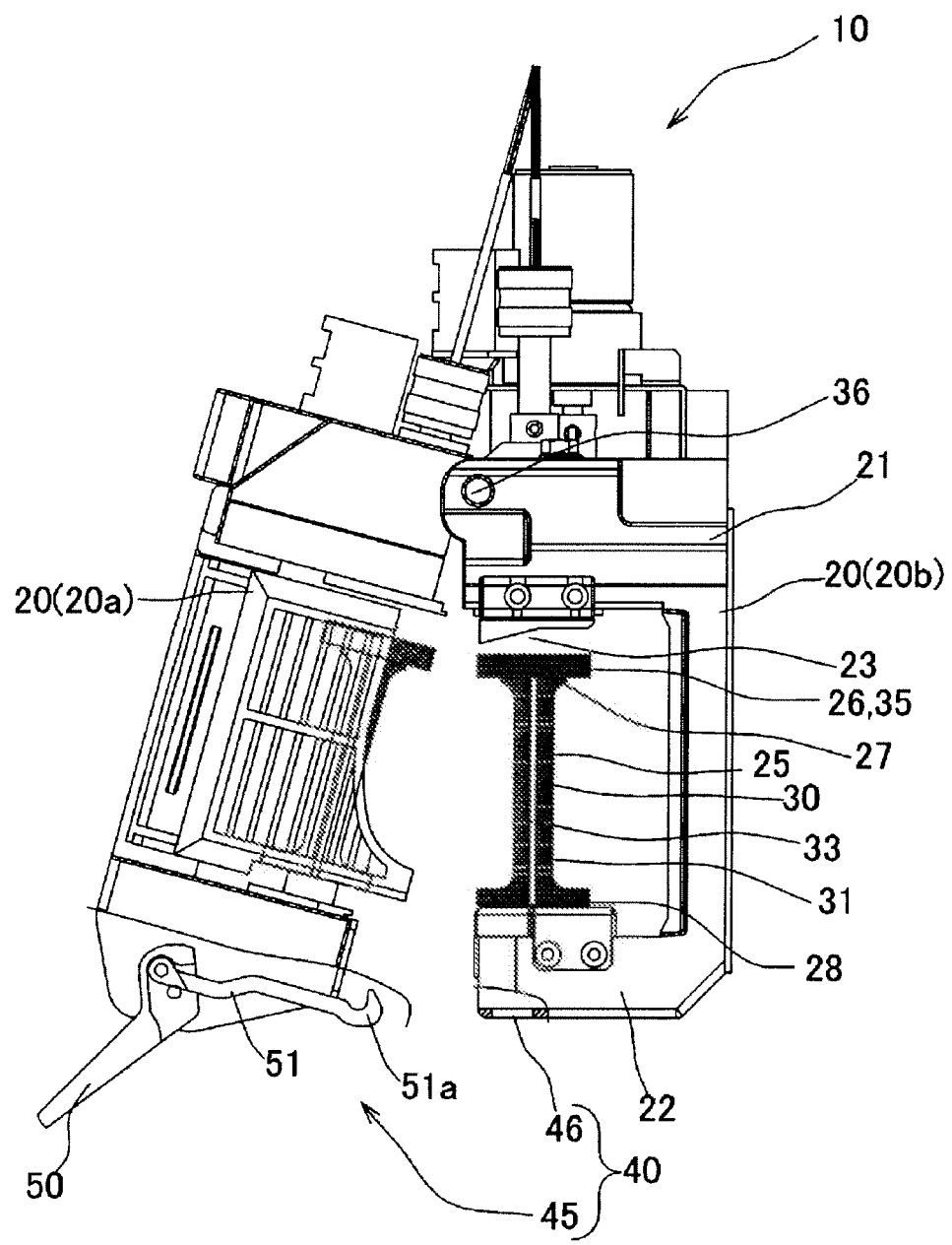
FIG. 8 is a front view showing that roller frames of the sealing device are separated from each other.

When the manipulation lever 50 goes into the opening position in a way described above, a gap d (see FIG. 9(*b*)) is formed between the distal end portion 51*a* of the engaging lever 51 and the receptor 46, both of which initially engage each other without any gap in the closed position shown in FIG. 9(*a*). If the manipulation lever is set as shown in FIG. 9(*b*), then a force, which acts on the engaging lever 51 to pull in the roller frame 20*b* toward the roller frame 20*a* in the closed position of the manipulation lever, is released. As a result, as shown in FIG. 7, the engaging lever 51 is eccentrically rotated relative to the first shaft 52 and thus can be removed from the receptor 46 of the roller frame 20*b*. Thus, as shown in FIG. 8, the sealing device 10 is set to allow the roller frames 20*a*, 20*b* to be separable from each other.

Meanwhile, when finishing the maintenance work or setting of the packaging paper 12, the roller frames 20*a*, 20*b* can revert to an integration state through procedures reverse to the above-described procedures. Specifically, when integrating the roller frames 20*a*, 20*b*, the grip portion 50*a* of the manipulation lever 50, which is tilted toward the front of the operator, is pushed toward the interior of the medicine packaging apparatus 1, that is toward the roller frame 20*b*. Then, the manipulation lever 50 is rotated around the first shaft 52.

When the roller frames 20*a*, 20*b* are separated from each other, the engaging lever 51 is supported by the second shaft 61 but is freely pivotable. That is, the engaging lever is suspended as supported by the second shaft 61. Thus, if the manipulation lever 50 is pushed in, then the supporting portion 58, which is provided in the compartmentalizing surface 53 constituting the recess 55 of the manipulation lever 50, is brought into contact with the engaging lever 51. Then, the engaging lever 51 is pushed up along with the manipulation lever 50 and, as shown in FIG. 9(*c*), the distal end portion 51*a* of the engaging lever 51 enters the receptor 46 (first engagement state). Thereafter, if the manipulation lever 50 is further pushed in, then the distal end portion 51*a* of the engaging lever 51 enters the receptor 46 provided in the roller frame 20*b* and then engages the receptor (second engagement state). If such a state is made, the second shaft 61 is moved to the front of the operator, that is, to the P2 position further apart from the roller frame 20*b* than the P2 position where the manipulation lever 50 is in the open position. Thus, the distal end portion 51*a* of the engaging lever 51 firmly catches in the receptor 46. Also, the roller frame 20*b* is pulled toward the roller frame 20*a* under a constant tensile force caused by the engaging lever, thereby achieving integration therebetween.

As described above, in the engaging mechanism 40 employed in the sealing device 10 according to this embodiment, the engager 45 provided in the roller frame 20*a* has the manipulation lever 50 rotatable around the first shaft 52 and the engaging lever 51 eccentrically rotatable relative to the first shaft 52. In the engaging mechanism 40, if the manipulation lever 50 is pushed in and rotated toward the roller frame 20*b* when the manipulation lever 50 is in the open position, then the manipulation lever 50 pushes and moves the engaging lever 51 and the engaging lever enters the receptor 46 (the first engagement state). Further, if the manipulation lever 50 is further pushed and rotated from the first engagement state, the second shaft 61 is further pulled in toward the roller frame 20*a* than the first engagement state and thus the distal end portion 51*a* of the engaging lever 51 firmly engages the receptor 46 (the second engagement state). Accordingly, the sealing device 10 can be set to the second engagement state where the roller frames 20*a*, 20*b* are firmly integrated merely by manipulating the manipulation lever 50. This provides good operability in association with integrating the roller frames 20*a*, 20*b*.

Further, in the above-described sealing device 10, when the first engagement state proceeds to the second engagement state by rotating the manipulation lever 50, the distal end portion 51*a* of the engaging lever 51 is moved toward the roller frame 20*a*. Thus, the sealing device 10 can integrate both the roller frames with the roller frame 20*b* pulled toward the roller frame 20*a*. Thus, according to the sealing device 10, when the roller frames 20*a*, 20*b* are once separated from each other through the release of the engaging mechanism 40 and thereafter the roller frames 20*a*, 20*b* are integrated again by using the engaging mechanism 40, the width of the clearances formed between the perpendicular heating parts 25, 25 provided in the roller frames 20*a*, 20*b* respectively or between the horizontal heating parts 26, 26 provided in the roller frames respectively can be nearly constantly maintained. Accordingly, even if the roller frames 20*a*, 20*b* are uncoupled and thereafter coupled again, the sealing device 10 can revert to a state suitable for thermal-bonding the sheet without adjusting the clearances between the perpendicular heating parts 25, 25 or between the horizontal heating parts 26, 26.

In the above-described medicine packaging apparatus 1 according to this embodiment, the sealing device 10 is arranged so that the roller frame 20*a* appears at the front when the housing 2 is opened. Further, according to the sealing device 10, the manipulation lever 50 is provided in the roller frame 20*a*. The operator's pushing the manipulation lever 50 toward the interior enables the roller frames 20*a*, 20*b* to be integrated. Pulling the manipulation lever 50 toward the front enables the roller frames 20*a*, 20*b* to be separable from each other. Thus, the medicine packaging apparatus 1 according to this embodiment can provide easy operation of separating the roller frames 20a, 20b for maintenance purpose of the sealing device 10 and integrating the roller frames.

According to the foregoing embodiment, to improve the operability of the engaging mechanism 40 provided in the sealing device 10, the roller frame 20a with the engager 45 including the manipulation lever 50 is disposed at the front, while the roller frame 20b is disposed at the interior. However, the present invention should not be limited to such arrangement. The positional arrangement of the roller frames 20a, 20b may include other positions than those of the foregoing embodiment.

Figure 14:
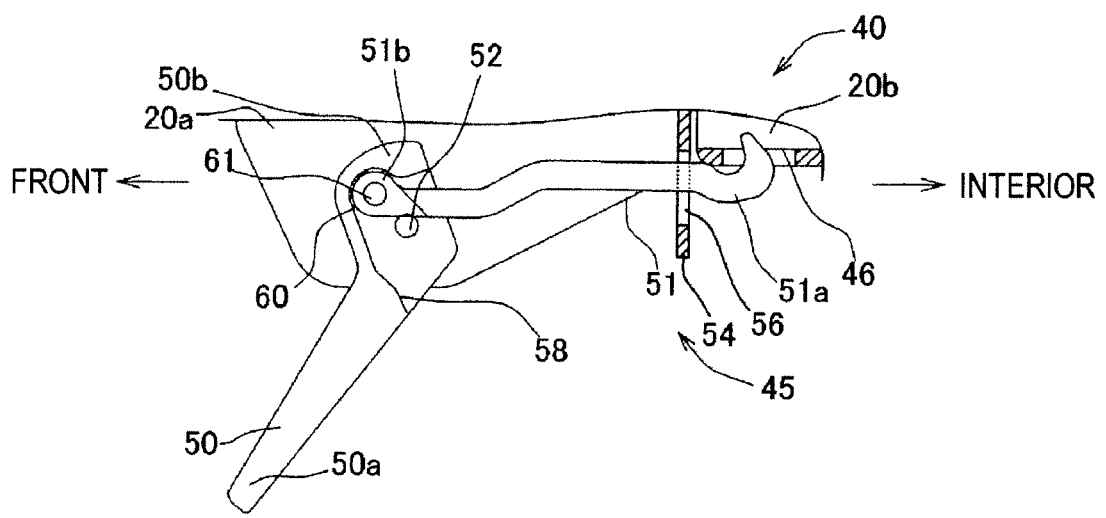
FIG. 14 is a front view showing that a stopper is provided in the sealing device shown in FIG. 9.

Further, according to the foregoing embodiment, when the manipulation lever 50 is tilted toward the front as shown in FIG. 9, an excess force therefrom may cause the engaging lever 51 to pivot up to the front around the second shaft 61 and thus to bump against the hand of the operator who is manipulating the manipulation lever 50. In this connection, as shown in FIG. 14, an annular stopper 54 may be provided. The stopper 64 is fixed to the roller frame 20a with the engaging lever 51 inserted through an aperture 56. This can prevent the engaging lever 51 from pivoting up to the front. The stopper 54 has a thickness of around 2.9 mm and is comprised of stainless steel such as SUS430. The stopper is configured to have a high stiffness for impact from the engaging lever 51 and to be thin so as not to occupy much space. Further, the stopper 54 may include various metallic materials other than the foregoing or a resin material insofar as its stiffness can be ensured. Alternatively, the stopper may have elasticity or flexibility to absorb the impact from the engaging lever 51. In such a case, the stopper may include an elastic member such as a resin material, a rubber material, or the like as well as a metallic material having a high elasticity such as phosphor bronze or stainless steel material of about 0.5 mm in thickness. The shape of the stopper 54 should not be limited to an annular shape. For example, the stopper may be formed in an approximate C shape to encircle the engaging lever 51. Further, the stopper may have any shape that will inhibit the engaging lever 51 from pivoting up to the front.

The above-described sealing device 10 employs the engaging mechanism 40. The present invention should not be limited thereto. The sealing device may employ, for example, an engaging mechanism 70 shown in FIG. 10. In detail, the engaging mechanism 70 includes an engager 80 and a shaft-shaped receptor 81. By rotating a manipulation part 85 constituting the engager 80, sickle-shaped engaging pieces 86, 87 can catch and engage the receptor 81. Specifically, as shown in FIG. 11, the engager 80 has a casing 92 in addition to the manipulation part 85 as well as the engaging pieces 86, 87. The manipulation part 85 is attached to the casing 92 to be exposed outwardly. Further, the casing 92 includes, in its inside, a rotary drive transmitting ring 88 (rotary power transmitter), a tilting piece 90 (connector) and a tilting shaft 91 in addition to the engaging pieces 86, 87. The casing houses the parts except the manipulation part 85.

As shown in FIG. 11, the manipulation part 85 is a member having a knob shape. The manipulation part has a grip 95 and a rotating shaft 96 (first rotator) substantially protruding perpendicularly from the grip. Further, an eccentric cam 97 (second rotator, eccentric rotator), which has a half-moon shape when viewed from the front, is located in the midway portion of the rotating shaft 96. When an axial center of the rotating shaft 96 is referred to as C1 and a center of a circumscribed circle circumscribing the eccentric cam 97 is referred to as C2 (second shaft), the center C2 is apart from the axial center C1 (first shaft).

The engaging piece 86 and the engaging piece 87 are metallic members having the same shape. The engaging pieces 86, 87 have a shaft inserting section 100 and an engaging section 101. The shaft inserting section 100 has a ring shape. The shaft inserting section includes an inserting aperture 102, to which both the rotating shaft 96 and the eccentric cam 97 of the aforesaid manipulation part 85 are inserted. A diameter of the inserting aperture 102 is approximately equal to a diameter of the circumscribed circle of the aforesaid eccentric cam 97. Thus, the eccentric cam 97 of the aforesaid manipulation part 85 can rotate within the inserting apertures 102 of the engaging pieces 86, 87. The engaging section 101 is configured to extend in a tangential direction of the shaft inserting section 100. A shaft aperture 103 is formed in the midway portion of the engaging section 101. Further, a hook section 104 bent in a hook shape is provided in a distal end of the engaging section 101.

The rotary drive transmitting ring 88 is a member having an approximate disk shape. The rotary drive transmitting ring has a cam inserting aperture 105a that has the same shape as the planar shape of the aforesaid eccentric cam 97 and is a perforated half-moon shape. The cam inserting aperture 105a is formed under positional adjustment such that a center of the rotary drive transmitting ring 88 and the center of the circumscribed circle of the eccentric cam 97 coincide with each other when the eccentric cam 97 is inserted to the cam inserting aperture. Further, the rotary drive transmitting ring 88 has two engaging portions 105b, 105c on its outer periphery. The engaging portions 105b, 105c are provided apart from each other by 180 degrees in a circumferential direction of the rotary drive transmitting ring 88. In an assembly of the engager 80, the rotary drive transmitting ring 88 is sandwiched between the shaft inserting sections 100, 100 of the aforesaid engaging pieces 86, 87 and the cam inserting aperture 105a communicates with the inserting apertures 102 of the engaging pieces 86, 87.

The tilting piece 90 intermits and continues the transmission of the rotary power between the rotary drive transmitting ring 88 and the engaging pieces 86, 87. The tilting piece functions as a so-called clutch. The tilting piece 90 is fitted between the engaging pieces 86, 87 like the rotary drive transmitting ring 88 and is disposed adjacent to the rotary drive transmitting ring 88. The tilting piece 90 has a bent section 106 formed in conformity with a portion of the outer periphery of the rotary drive transmitting ring 88, a lever section 107 and a shaft aperture 108. Further, an engaged portion 110, which is cut out such that the engaging portion 105b of the aforesaid rotary drive transmitting ring 88 can engage the engaged section, is formed in the midway portion of the bent section 106. The tilting piece 90 is fit between and integrated to the engaging pieces 86, 87 with the tilting shaft 91 inserted to both the shaft aperture 108 and the shaft apertures 103, 103 of the engaging pieces 86, 87. In the assembly of the engager 80, the tilting piece 90 is positioned such that the bent section 106 is placed to be in contact with the outer periphery or the engaging portion 105b of the rotary drive transmitting mechanism 88. Further, in the assembly of the engager 80, the lever section 107 is sandwiched between the engaging sections 101, 101 of the engaging pieces 86, 87 and slightly protrudes from an edge of the engaging piece 101, 101, at which the hook section 104 is formed (hereinafter, this edge is referred to as an abutment edge 111). Thus, when an object abuts against the engager 80 through the abutment edge 111, the object first contacts the lever section 107 of the tilting piece 90.

Figure 10:
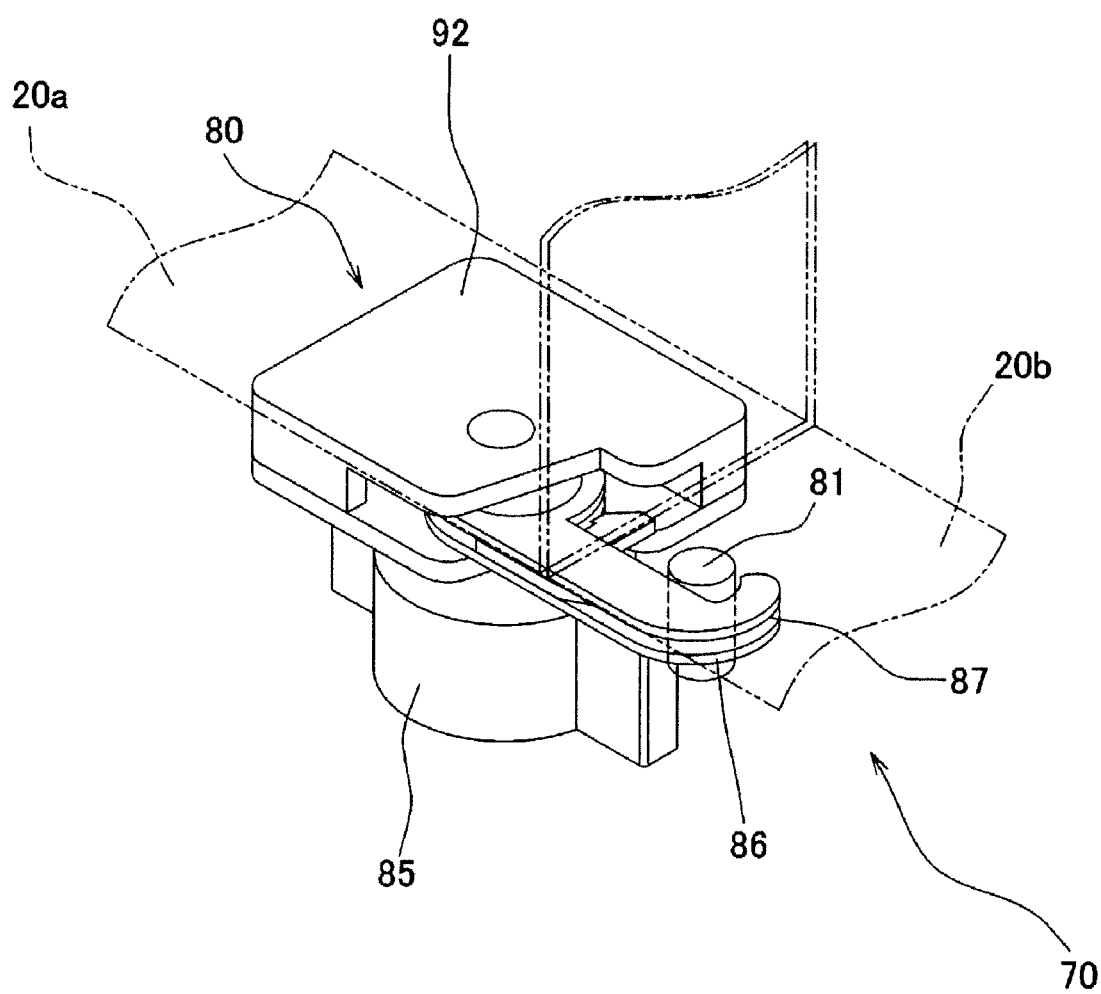
FIG. 10 is a perspective view showing an alternative example of the engaging mechanism.
Figure 11:
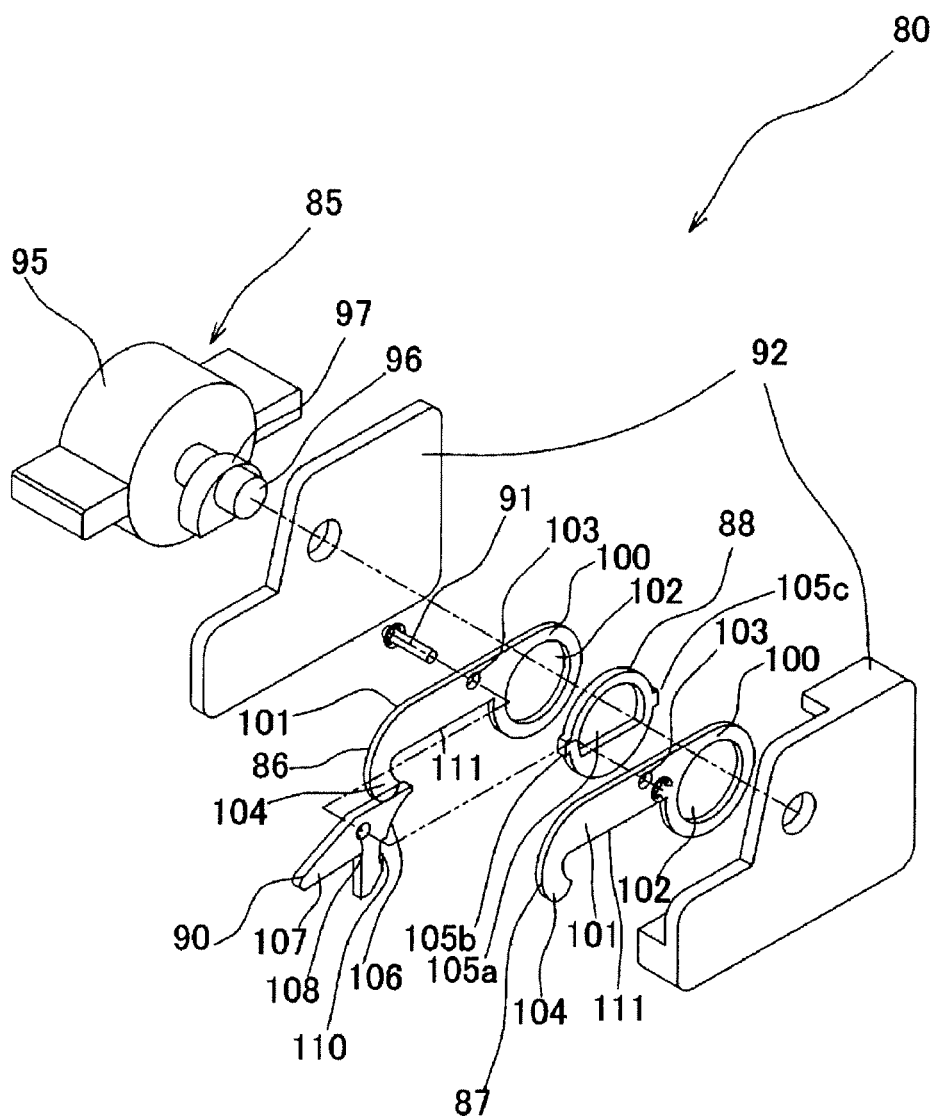
FIG. 11 is an exploded perspective view showing an engager employed in the engaging mechanism shown in FIG. 10.

As shown in FIG. 10, the engager 80 constructed as described above is attached to the lower edge portion 22 of the roller frame 20a such that the manipulation part 85 protrudes downwardly. Thus, the engager 80 is attached such that the rotating shaft 96 is vertically oriented and is nearly perpendicular to the lower edge portion 22 and the engaging pieces 86, 87 and the tilting piece 90 are nearly horizontally pivotable alongside the lower edge portion 22.

As shown in FIG. 10, the receptor 81 is provided in the roller frame 20b so as to protrude downwardly. The receptor 81 is positioned such that the engaging pieces 86, 87 engage the receptor by the rotation of the manipulation part 85 of the aforesaid engager 80.

Figure 12:
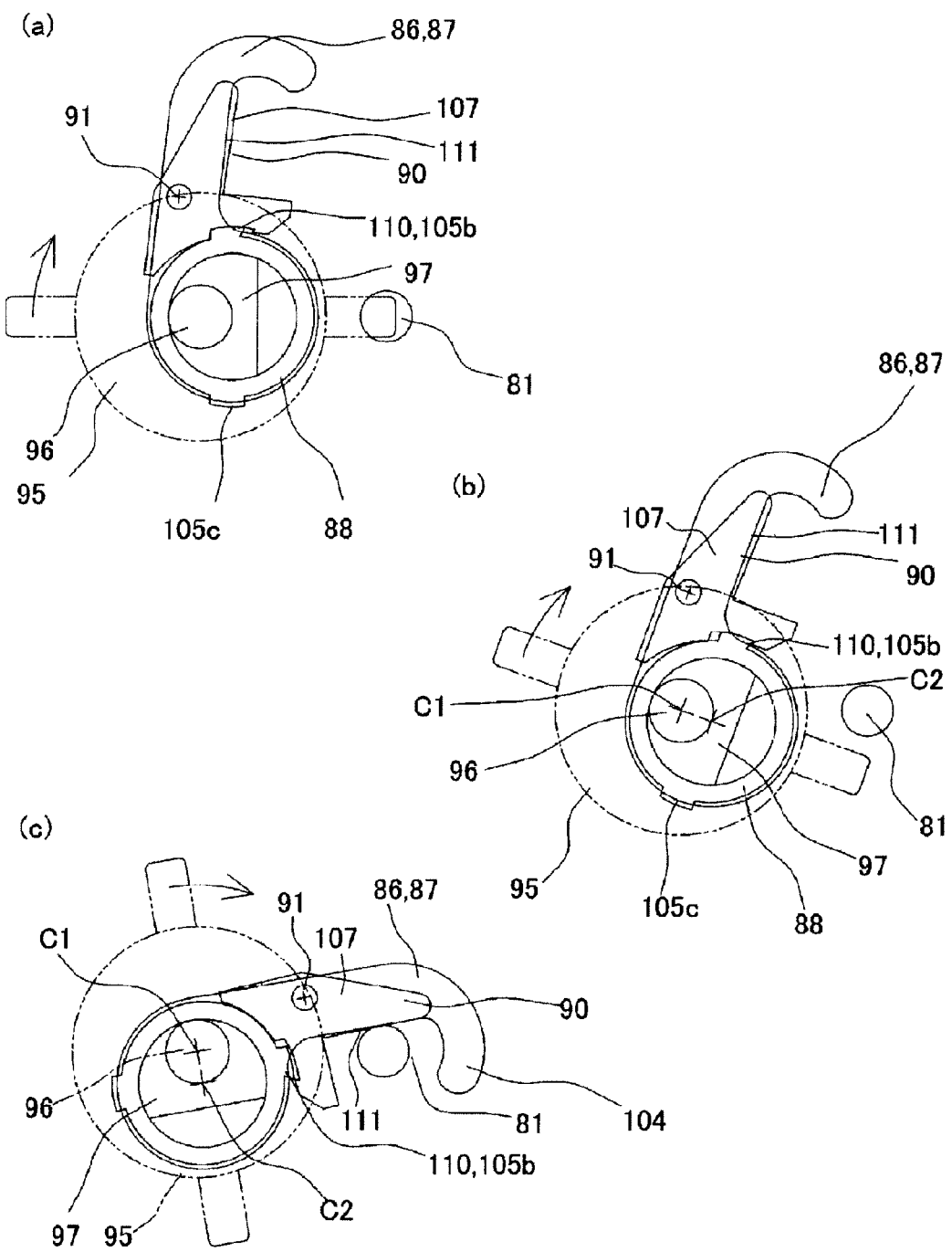
FIGS. 12(a) to 12(c) illustrate the operation of the engaging mechanism shown in FIG. 10 in sequential steps respectively.

According to the sealing device 10 including the above-described engaging mechanism 70, when there is a need to conduct the replacement of the packaging paper 12 or the maintenance work of the sealing device 10, if the housing 2 is opened and the manipulation part 85 of the engager 80 (which is provided in the lower portion of the roller frame 20a being in the front) is rotated, then the roller frames 20a, 20b become separable from each other or can be integrated. More specifically, in association with integrating the roller frames 20a, 20b together, rotating the grip 95 is performed as shown in FIG. 12(a). Then, the rotation of the grip rotates both the rotating shaft 96 and the eccentric cam 97 and the rotary drive transmitting ring 88 mounted thereto are eccentrically rotated thereby.

In this regard, when the roller frames 20a, 20b are separated from each other, the engaging portion 105b of the rotary drive transmitting ring 88 remains as engaging the engaged portion 110 provided in the tilting piece 90, as shown in FIG. 12(a). Thus, if the grip 95 of the manipulation part 85 is rotated when the roller frames 20a, 20b are separated, then the tilting piece 90 and the engaging pieces 86, 87 are eccentrically rotated relative to the rotating shaft 96 as integrated with the eccentric cam 97 and the rotary drive transmitting ring 88.

If the manipulation part 85 is manipulated as shown by arrows in FIGS. 12(a) and 12(b), then the lever section 107 of the tilting piece 90, a portion of which protrudes from the abutment edges 111 of the engaging pieces 86, 87, is brought into abutment with the receptor 81 provided in the roller frame 20b, as shown in FIG. 12(c). As a result, the tilting piece 90 is tilted around the tilting shaft 91 to thus incline. If the grip 95 of the manipulation part 85 is further rotated from such a state, then the engaged portion 110 of the tilting piece 90 and the engaging portion 105b of the rotary drive transmitting ring 88 are disengaged from each other, as shown in FIG. 13(a). Therefore, once the lever section 107 of the tilting piece 90 is in abutment with the receptor 81, the rotary power produced by the manipulation of the manipulation part 85 is no longer transmitted to the engaging pieces 86, 87. Thus, although the manipulation part 85 is manipulated in a direction indicated by an arrow after the state shown in FIG. 13(a), the engaging pieces 86, 87 are not allowed to rotate around the axial center C1 of the rotating shaft 96.

If the rotation of the manipulation part 85 is further continued after the lever section 107 abuts against the receptor 81, then the eccentric cam 97 is eccentrically rotated relative to the rotating shaft 96 passing through the center of the shaft inserting section 100 within the shaft inserting section 100 provided in the engaging piece 86, 87, as shown in FIG. 13(b). Further, in this case, the center C2 corresponding to a rotation center of the eccentric cam 97 moves away from the receptor 81 in concomitance with the manipulation of the manipulation part 85. As a result, the engaging pieces 86, 87 are moved away from the receptor 81 as a whole along with the movement of the eccentric cam 97 fitted to the shaft inserting section 100. That is, the engaging pieces 86, 87 are moved such that a gap between the receptor 81 and the hook sections 104 provided in the distal ends of the engaging pieces 86, 87 becomes small. Thus, if a state shown in FIG. 13(b) is achieved, the hook sections 104 provided in the distal ends of the engaging pieces 86, 87 firmly catch and thus engage the receptor 81. Further, when the manipulation part 85 is rotated till the state shown in FIG. 13(b), the rotary drive transmitting ring 88 disengages from the tilting piece 90 in the state shown in FIG. 13(a) and is rotated by about 90 degrees. As a result, the engaging portion 105c of the rotary drive transmitting ring 88 is brought into abutment with the tilting piece 90, thereby allowing no more rotation.

Meanwhile, as for separating the roller frames 20a, 20b, the roller frames are initially in the state shown in FIG. 13(b). At this state, as the manipulation part 85 is rotated in a direction opposite to the foregoing, the eccentric cam 97 is eccentrically rotated relative to the rotating shaft 96 passing through the center of the shaft inserting section 100. Further, in this case, the rotation center of the eccentric cam 97 approaches the receptor 81 in concomitance with the manipulation of the manipulation part 85 and thus the engaging pieces 86, 87 approach the receptor 81 as a whole along with the approach of the eccentric cam. As a result, as shown in FIG. 13(a), the gap is formed between the receptor 81 and the hook sections 104 provided in the distal ends of the engaging pieces 86, 87.

Thereafter, as the manipulation part 85 is further rotated in a direction opposite to the arrow shown in FIG. 13(a), the engaging portion 105b of the rotary drive transmitting ring 88 engages the engaged portion 110 of the tilting piece 90 as shown in FIG. 12(c), thereby reverting to the state where the rotary power produced by the manipulation of the manipulation part 85 can be transmitted to the engaging pieces 86, 87. Thereafter, if the manipulation part 85 is further rotated in a direction opposite to the arrow shown in FIG. 12(c), then the tilting piece 90 and the engaging pieces 86, 87 are rotated away from the receptor 81 as integrated with the eccentric cam 97 and the rotary drive transmitting ring 88, as shown in FIG. 12(b). As a result, as shown in FIG. 12(a), the engaging pieces 86, 87 are completely separated from the receptor 81. When such a state is made, the roller frames 20a, 20b can be freely separated.

When employing the engaging mechanism 70 including the combination of the engager 80 and receptor 81 described above, merely rotating the grip 95 of the manipulation part 85 allows the engaging pieces 86, 87 of the engager 80 to catch and thus engage the receptor 81. Also, that allows the engaging pieces 86, 87 to pull the receptor 81, thereby firmly integrating the roller frames 20a, 20b without any gap. Thus, according to the sealing device 10 employing the engaging mechanism 70, the width of the clearances formed between the perpendicular heating parts 25, 25 or between the horizontal heating parts 26, 26 can be nearly constantly maintained when the roller frames 20a, 20b are integrated together.

Further, in the sealing device 10 employing the engaging mechanism 70, in some embodiments it is preferred that the engager 80 including the manipulation part 85 for conducting the above-described operations is provided in the roller frame 20a which is located in the front when the housing 2 is opened.

The foregoing embodiments show that the sealing device 10 including the engaging mechanism 40 or the engaging mechanism 70 is employed in the medicine packaging apparatus 1. The present invention, however, should not be limited thereto. The sealing device may be used in other types of apparatus or may be used alone.

The invention claimed is:
1. A sealing device comprising:
a pair of frames A, B each including a heating part attached thereto such that each of the heating parts are rotatable around a predetermined rotating shaft, the heating part generating heat by energization; and
an engaging mechanism configured to couple the frames A, B such that the frames A, B are not separated in a direction that widens a gap between the heating parts,
wherein when the frames A, B are coupled by the engaging mechanism, a thermally bondable sheet is fusion-bonded while being passed through a clearance formed between the heating parts,
wherein the engaging mechanism includes an engager and a receptor,
wherein the engager is provided in the frame A and includes:
 a first rotator rotatable around a first shaft; and
 a second rotator rotatable around the first shaft in concomitance with a rotation of the first rotator, the second rotator eccentrically rotatable relative to the first shaft,
wherein the second rotator is biased toward the receptor by a biasing force,
wherein the receptor is provided in the frame B and the second rotator is engageable to the receptor,
wherein the second rotator is maintained by the biasing force in a state where the second rotator engages the receptor, and
wherein when a force acting on the second rotator in a direction against the biasing force due to the rotation of the first rotator goes beyond the biasing force acting on the second rotator, the second rotator is eccentrically rotated relative to the first shaft and thereby the second rotator disengages from the receptor.

2. The sealing device of claim 1, wherein a manipulation lever constituting the first rotator and an engaging lever constituting the second rotator are rotatably supported around the first shaft in the frame A, and
 wherein the engaging lever is rotatably supported around a second shaft located eccentrically relative to the first shaft.

3. The sealing device of claim 2, wherein when the force acting on the second rotator in a direction against the biasing force due to rotation of the first rotator goes beyond the biasing force acting on the second rotator, the second rotator is rotated around the second shaft that is moved while forming a circular arc around the first shaft.

4. The sealing device of claim 1, wherein the second rotator is switchable by the rotation of the first rotator to a first engagement state where the second rotator is engageable to the receptor in a position P1 and to a second engagement state where the second rotator is pulled to a position P2 closer to the frame A than the position P1 engaging the receptor.

5. A sealing device comprising:
 a pair of frames A, B each including a heating part attached thereto such that each of the heating parts are rotatable around a predetermined rotating shaft, the heating part generating heat by energization; and
 an engaging mechanism configured to couple the frames A, B such that the frames A, B are not separated in a direction that widens a gap between the heating parts,
 wherein when the frames A, B are coupled by the engaging mechanism, a thermally bondable sheet is fusion-bonded while being passed through a clearance formed between the heating parts,
 wherein the engaging mechanism includes an engager and a receptor,
 wherein the engager is provided in the frame A and includes:
  a first rotator rotatable around a first shaft; and
  a second rotator rotatable around the first shaft in concomitance with a rotation of the first rotator, the second rotator eccentrically rotatable relative to the first shaft,
 wherein the receptor is provided in the frame B and the second rotator is engageable to the receptor,
 wherein the second rotator is switchable by the rotation of the first rotator of the engager to a first engagement state where the second rotator is engageable to the receptor in a position P1 and to a second engagement state where the second rotator is pulled to a position P2 closer to the frame A than the position P1 engaging the receptor,
 wherein the second rotator includes:
  an eccentric rotator eccentrically rotatable relative to the first shaft;
  an engaging piece engageable to the receptor; and
  a connector configured to connect the eccentric rotator and the engaging piece such that the eccentric rotator and the engaging piece are integratedly rotatable,
 wherein the second rotator is switchable to an integrated rotation state where the eccentric rotator and the engaging piece are connected and integrated via the connector to be eccentrically rotatable, and to an independent rotation state where the eccentric rotator and the engaging piece are disconnected and the eccentric rotator is eccentrically rotatable independently relative to the engaging piece,
 wherein when the engaging piece engages the receptor, the second rotator goes into the first engagement state and the independent rotation state,
 wherein when the eccentric rotator is eccentrically rotated independently relative to the engaging piece in the independent rotation state, the engaging piece is moved toward the frame A by the eccentric rotator and the second rotator goes into the second engagement state,
 wherein the connector is configured to abut the receptor prior to the engaging piece,
 wherein when the engaging piece is brought into abutment with the receptor, the second rotator goes into the independent rotation state, and
 wherein when the engaging piece is separated from the receptor, the second rotator goes into the integrated rotation state.

6. The sealing device of claim 5, wherein the second rotator includes a rotary power transmitter integratedly rotatable with the eccentric rotator, the rotary power transmitter being configured to transmit rotary power exerted to the eccentric rotator to the engaging piece via the connector by engaging the connector,
 wherein the connector is tiltably supported relative to the engaging piece by a tilting shaft attached to the engaging piece,
 wherein when the engaging piece is brought into abutment with the receptor, the connector tilts around the tilting shaft and the rotary power transmitter disengages from the connector, thereby going into the independent rotation state, and
 wherein when the engaging piece is separated from the receptor, the rotary power transmitter engages the connector, thereby going into the integrated rotation state.

* * * * *